United States Patent
Yang et al.

(10) Patent No.: US 11,908,155 B2
(45) Date of Patent: Feb. 20, 2024

(54) EFFICIENT POSE ESTIMATION THROUGH ITERATIVE REFINEMENT

(71) Applicant: QUALCOMM Incorporated, San Diego, CA (US)

(72) Inventors: John Yang, Glendale, CA (US); Yash Sanjay Bhalgat, San Diego, CA (US); Fatih Murat Porikli, San Diego, CA (US); Simyung Chang, Suwon (KR)

(73) Assignee: QUALCOMM Incorporated, San Diego, CA (US)

( * ) Notice: Subject to any disclaimer, the term of this patent is extended or adjusted under 35 U.S.C. 154(b) by 459 days.

(21) Appl. No.: 17/203,607

(22) Filed: Mar. 16, 2021

(65) Prior Publication Data

US 2022/0301216 A1    Sep. 22, 2022

(51) Int. Cl.
  *G06F 18/213* (2023.01)
  *G06N 20/00* (2019.01)
  *G06T 7/70* (2017.01)

(52) U.S. Cl.
  CPC .............. *G06T 7/70* (2017.01); *G06F 18/213* (2023.01); *G06N 20/00* (2019.01); *G06T 2207/20081* (2013.01)

(58) Field of Classification Search
  CPC .......... G06N 3/08; G06N 3/044; G06N 3/045; G06N 3/063; G06N 20/00; G06F 18/213; G06T 7/70; G06T 2207/20081
  See application file for complete search history.

(56) References Cited

U.S. PATENT DOCUMENTS

| | | | |
|---|---|---|---|
| 10,970,518 B1* | 4/2021 | Zhou | G06T 7/73 |
| 11,403,800 B1* | 8/2022 | Prokudin | G06V 10/82 |
| 2019/0171871 A1* | 6/2019 | Zhang | G06V 40/103 |
| 2022/0139251 A1* | 5/2022 | Sweeney-Dillon | G06Q 10/10 |
| | | | 434/238 |

OTHER PUBLICATIONS

Du et al.—Multi-Task Information Sharing Based Hand Pose Estimation (Year: 2019).*
Shen et al.—Attention-Aware Adversarial Network for Person Re-Identification (Year: 2019).*
Fabris et al.—3DOPE-DL: Accuracy Evaluation of a Deep Learning Framework for 3D Object Pose Estimation (Year: 2020).*

(Continued)

*Primary Examiner* — Amandeep Saini
*Assistant Examiner* — Mehrazul Islam
(74) *Attorney, Agent, or Firm* — QUALCOMM Incorporated

(57) ABSTRACT

Certain aspects of the present disclosure provide a method, including: processing input data with a feature extraction stage of a machine learning model to generate a feature map; applying an attention map to the feature map to generate an augmented feature map; processing the augmented feature map with a refinement stage of the machine learning model to generate a refined feature map; processing the refined feature map with a first regression stage of the machine learning model to generate multi-dimensional task output data; and processing the refined feature data with an attention stage of the machine learning model to generate an updated attention map.

28 Claims, 6 Drawing Sheets

(56) References Cited

OTHER PUBLICATIONS

Battash B., et al., "Adaptive and Iteratively Improving Recurrent Lateral Connections", arxiv.org, Cornell University Library, 201 Olin Library Cornell University Ithaca, NY14853, Oct. 16, 2019, XP081520432, 10 Pages, abstract, Sections 1, 3 and 4, figures 1,2,3.
Fan Z., et al., "Adaptive Computationally Efficient Network for Monocular 3D Hand Pose Estimation", 2020, arxiv.org, pp. 127-144, XP047589187, abstract, Sections 1-4, figures 1,2,4.
Guo Q., et al., "Dynamic Recursive Neural Network", 2019 IEEE/CVF Conference on Computer Vision and Pattern Recognition (CVPR), IEEE, Jun. 15, 2019, pp. 5142-5151, XP033687347, DOI: 10.1109/CVPR.2019.00529, abstract, Sections 1, 3, and 4, figures 1-4.
International Search Report and Written Opinion—PCT/US2022/071171—ISA/EPO—dated Aug. 26, 2022.
Yang J., et al., "SeqHAND: RGB-Sequence-Based 3D Hand Pose and Shape Estimation", 2020, arxiv.org, pp. 122-139, XP047582364, abstract, Sections 1 and 3-5, figure 5.

\* cited by examiner

300

---
Progressive Training Protocol
---

Inputs: maximum number of loops $l_{max}$, training data $S = \{s_i\} = \{(x, J_{2D}^{gt}, J_{3D}^{gt})_i\}$ and learning rate $\text{Lr}$ for $l_{prog} = 0$ *to* $l_{max}$ do
    Initialize Iter-ScopeNet $\text{IS}_{w,l_{prog}}$ with $l_{prog} + 1$ batch-norm layers
    if $l_{prog} > 0$ then
        $\text{IS}_{w,l_{prog}} \leftarrow \text{IS}_{w,l_{prog}-1}$
        Detach FE from training
        Reduce $\text{Lr}$ by 1/10 except AMG
    end
    while *NOT stop criterion* do
        for $s_i \in S$ do
            for $l = 0$ *to* $l_{prog}$ do
                $\hat{J}_{2D}^l, \hat{J}_{3D}^l, \alpha_{2D}^l, \alpha_{3D}^l = \text{IS}_{w,l}(x)$
            end
            Calculate $L_{total}$ using Eq. 13
            Update $w$ based on $L_{total}$ by $\text{Lr}$
        end
    end
end

FIG. 3

EFFICIENT POSE ESTIMATION THROUGH ITERATIVE REFINEMENT

INTRODUCTION

Aspects of the present disclosure relate to machine learning, and in particular to pose estimation using machine learning models.

Machine learning is generally the process of producing a trained model (e.g., an artificial neural network), which represents a generalized fit to a set of training data that is known a priori. Applying the trained model to new data enables production of inferences, which may be used to gain insights into the new data.

Pose estimation (e.g., of a human body part) is a critical component of most interactive augmented reality and virtual reality (collectively "extended reality") systems. For hand-based interactions with objects in extended reality environments, it is important to obtain highly accurate estimates of the positions of hand joints in three-dimensional world coordinates (as well as image plane coordinates).

Unfortunately, many state-of-the-art pose estimation models achieve high accuracy through large and complex model architectures, which incur substantial computational cost. Such models are therefore generally unsuitable for relatively lower power computing devices, like mobile devices, which ironically are the devices for which the capabilties may be most useful.

Accordingly, improved model architectures for pose estimation are needed.

BRIEF SUMMARY

Certain aspects provide a method, comprising: processing input data with a feature extraction stage of a machine learning model to generate a feature map; applying an attention map to the feature map to generate an augmented feature map; processing the augmented feature map with a refinement stage of the machine learning model to generate a refined feature map; processing the refined feature map with a first regression stage of the machine learning model to generate multi-dimensional task output data; processing the refined feature data with an attention stage of the machine learning model to generate an updated attention map.

Other aspects provide a method of training a machine learning model, comprising: processing training data with a machine learning model, wherein the machine learning model comprises: a feature extraction stage configured to generate a feature map; a refinement stage configured to process an augmented feature map, based on the feature map and an attention map, and to generate a refined feature map; an attention stage configured to the refined feature map and to generate an updated attention map; and a first regression stage configured to process the refined feature map to generate multi-dimensional task output data; determining a training loss based on a training loss function, wherein the training loss function comprises: an uncertainty loss component; and a task loss component; and updating the machine learning model based on the training loss.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

FIG. 3 depicts an example of a progressive training algorithm.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Aspects of the present disclosure provide apparatuses, methods, processing systems, and non-transitory computer-readable mediums for performing pose estimation using machine learning models. In particular, aspects described herein relates to machine learning model architectures for efficiently estimating body element (e.g., hand) poses in a three-dimensional space based on two-dimensional input images.

The pose estimation model architectures described herein may generally include an iterative backbone network, a pose predictor, an uncertainty estimator, and a decision gating function. Beneficially, these model architectures continuously refine predictions over recursive iterations of a refinement module and an attention map generator of the iterative backbone network until the decision gating function cause the loop to exit.

The pose estimation model architectures described herein may further use a different batch normalization layers for each iteration through the refinement module, which beneficially stabilizes the gradients during training and mitigates any statistical confusion in batch normalization layers caused by the attention map generator.

The gating function of the pose estimation model architectures described herein generally considers confidence measures of the network's own estimations (e.g., uncertainty) to decide on discrete gating via an objective function. For example, the gating function may estimate uncertainty of model inferences, such as multi-dimensional (e.g., two-dimensional and three-dimensional) keypoint predictions, in order to determine when to exit the iterative backbone network.

Finally, aspects described herein relate to a progressive training technique for pose estimation model architectures that improves inferencing efficiency by causing more samples to exit the iterative backbone network after fewer iterations.

The pose estimation model architectures described herein thus generate efficient inferences in terms of computational cost and memory use, which beneficially allows such model architectures to be deployed to a wider range of devices, such as mobile devices, always-on devices, Internet of Things devices, edge processing devices, and the like. Accordingly, the iterative pose estimation model architectures described herein provide a technical solution to the shortcomings of conventional approaches, as described above.

EXAMPLE POSE ESTIMATION MODEL ARCHITECTURE

Figure 1:
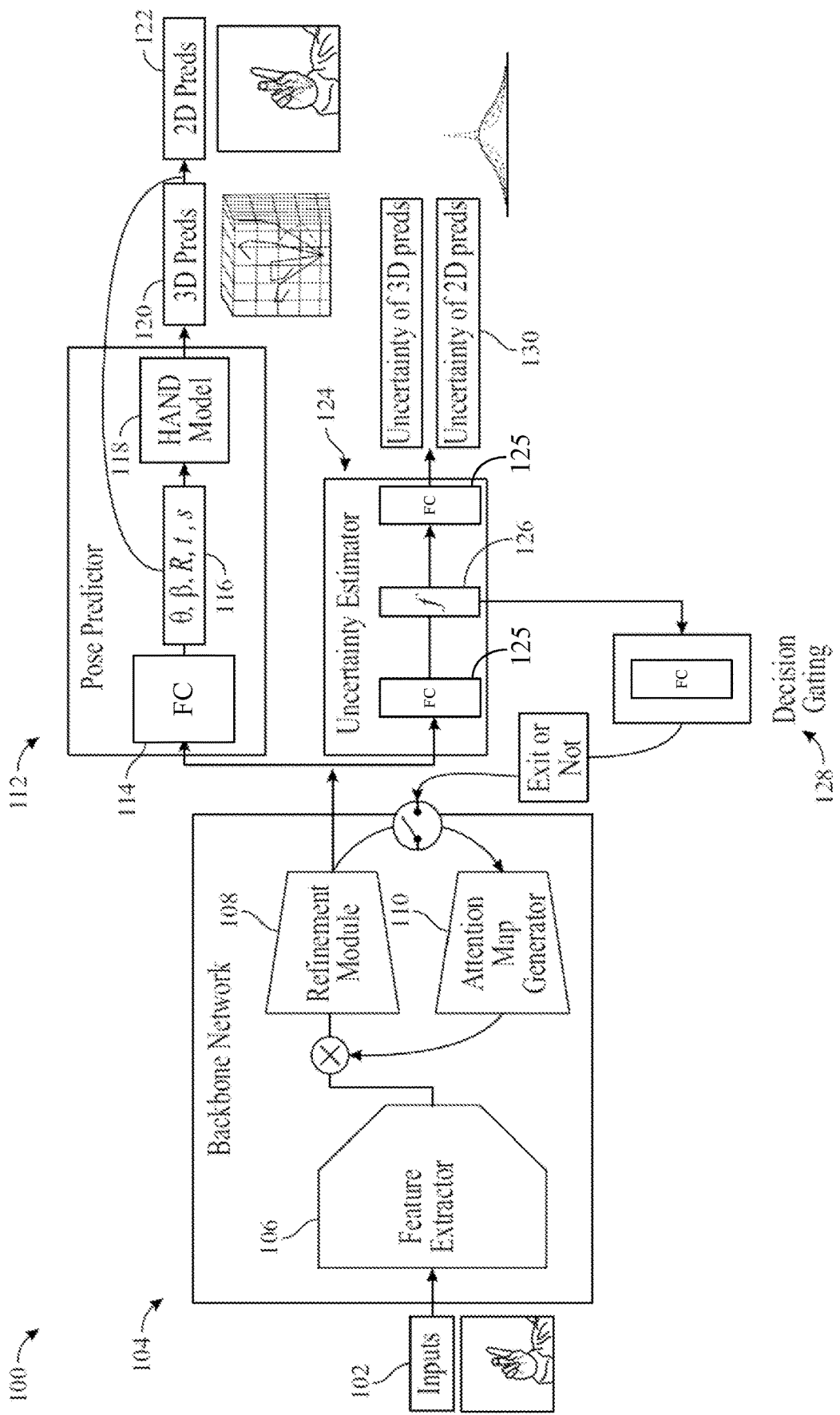
FIG. 1 depicts an example pose estimation model architecture.

FIG. 1 depicts an example pose estimation model architecture 100.

Generally, model architecture 100 depicts a modular network wherein model parameters may be iteratively exploited for more accurate predictions through adaptive spatial scoping. Specifically, the adaptive nature of model architecture 100 is provided by the gated looping mechanism that allows for the model to use only a necessary amount of complexity to generate confident pose predictions.

As depicted, model architecture 100 consists of an iterative backbone network 104, which itself comprises a feature extractor 106, a refinement module 108, and an attention map generator 110. Model architecture 100 further includes a pose predictor 112, which in this example includes a hand model 118, but which in other examples may include other body element models, including full human body skeletal models, which include bones and joints of the human body. Model architecture further includes an uncertainty estimator 124 and a decision gating function 128, which are configured to control looping within iterative backbone network 106, and thus enable the adaptive scoping aspect of model architecture 100.

In the depicted example, a monocular image of a hand is provided as input data 102 to feature extractor 106, which generates features based on the input data that are then provided to refinement module 108. The outputs of refinement module 108 are then provided to (1) pose predictor 112, (2) uncertainty estimator 124, and (3) attention map generator 110. Note that in the depicted example, the output of refinement module 108 is provided to attention map generator 110 based on the output of gating function 128's decision, which may be compared to a predefined uncertainty threshold. In some cases, the predefined uncertainty threshold is a hyperparameter to be tuned, wherein different values for this threshold give different accuracy vs efficiency trade-offs. Thus, uncertainty estimator 124 and gating function 128 generally control the looping of refinement module 108 and attention map generator 110 until a condition is met, and then outputs 120 and/or 122 are provided as output of model architecture 100. The condition may be, for example, the gating threshold being met or a loop limit being reached.

Each of the aforementioned components of model architecture 100 will now be described in more detail.

Iterative Backbone Network

In the depicted example, iterative backbone network 104 is a residual network configured to perform recursive inference, which generally allows usage of higher-level features for refinement of lower-level features to exploit the capacity of network parameters. In other words, iterative backbone network 104 has a low default complexity, which can be increased at each recursive use (e.g., in each loop). This beneficially enables a smaller model size (e.g., a smaller neural network) to have similar prediction accuracy as a more complex model, which reduces the memory requirements and allows for implementation on a wider variety of devices.

Feature extractor 106 is generally configured to encode low-level image features of input data 102. In some cases, feature extractor 106 may be implemented by a neural network model (or a portion thereof), such as a convolutional neural network model. One example of a feature extraction stage of a neural network model is depicted and described in more detail with respect to FIG. 2.

Since feature extractor 106 is not operated recursively, as with refinement module 108 and attention map generator 110, its feature encoding can be configured to incorporate heavy down-sampling of the feature maps so that the recursive computation of them is less costly. For example, feature extractor 106 may be configured to reduce the spatial dimensions of image inputs (e.g., 102) from, for example, 224 by 224 pixels to 28 by 28 pixels, in order to make iterations through refinement module 108 and attention map generator 110 more efficient. This is just one example, and generally the input size and downsizing ratio can be configured as needed.

During inferencing, output from feature extractor 106 may be stored in a memory (not depicted) so as to not be generated over and over again for recursive loops of other aspects of iterative backbone network 104. This further improves the computational efficiency of model architecture 100.

Refinement module 108 is generally configured to be recursively "looped" so that in every iteration, attention-augmented feature maps generated by attention map generator 110 may be used to refine the predictions of the previous loop. Notably, this attention-augmentation may change the distribution of the input feature map in every loop iteration. Hence, a separate batch normalization layer may be used in every iteration to account for the statistic shifts of input feature maps that are attention-augmented, as depicted in FIG. 2.

Figure 2:
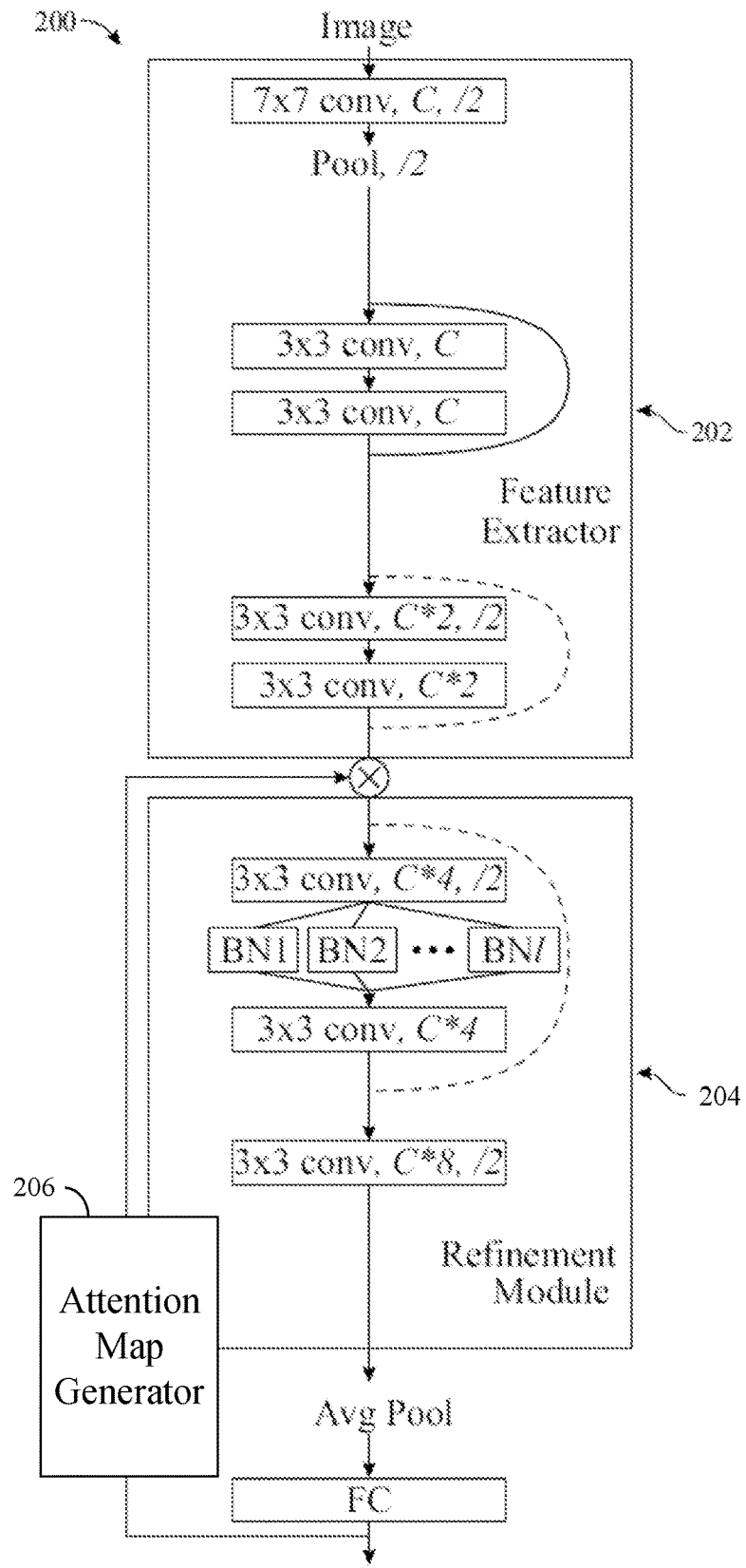
FIG. 2 depicts an example of an iterative backbone network.

In particular, FIG. 2 depicts an example of an iterative backbone network 200, including a feature extractor 202, refinement module 204, and attention map generator 206. Note that there are l batch normalization layers ($BN_1$ . . . $BN_l$), where l is a configurable number of loops allowed within iterative backbone network 200. In other words, for computational efficiency, it may be desirable to limit the loops to a configurable number, such as 4 loops, in order to prevent excessive looping and unnecessary latency.

Returning to FIG. 1, attention map generator 110 may be implemented, in some examples, as an upscaling decoder that outputs the same number of attention maps as the number of feature maps for element-wise multiplication of the two. In some cases, the attention map generated by attention map generator 110 may include values generally in the range of [0, 1], which may then be applied (element-wise) to the feature maps output by refinement module 108 in order to enable the "attention" mechanism.

In some aspects, in order to effectively upscale the output vectors of refinement module 108 without significantly increasing computational cost, the decoder may be configured to pixel-shuffle layers, which lowers computation cost by bringing channel features into the spatial features. Generally, upscaling can be done in many ways, including bilinear interpolation, deconvolution, and pixel-shuffle operations to name a few examples. Pixel-shuffling beneficially preserves more information than other alternatives.

Pose Predictor

Generally, pose predictor 112 is configured to generate three-dimensional and/or two-dimensional pose predictions (or estimates) based on input feature maps provided by iterative backbone network 104.

As in the depicted example, pose predictor 112 may include one or more fully-connected (FC) layers (e.g., layers 114) of a neural network model. In such examples, the fully-connected layers 114 of pose predictor 112 generate multi-dimensional output 116 that is used for input to hand model 118. Fully-connected layers 114 may be referred to as a regression stage in some cases because the outputs are regression values instead of categorical values.

In this example, the multi-dimensional output 116 includes a plurality of parameters, including a rotation matrix R, a translation t, a scaling factor s, a pose $\theta$, and a shape $\beta$. Generally, the pose $\theta$, and a shape $\beta$ parameters may be used to generate a three-dimensional pose prediction with hand model 118, which may then be projected to a two-dimensional plane using the R, t, and s parameters in this example. In this example, R, t, and s may be referred to as extrinsic parameters of the camera capturing the input data.

In one example, hand model 118 is a MANO hand mesh deformation model configured to take an inputs low-dimensional vectors as parameters for $\theta$ and $\beta$ for controlling three-dimensional hand mesh outputs according to $J(\theta,\beta) = R_\theta(J(\beta))$, where J is a function for predicting body element joint positions. For example, the location of the 21 joints in a hand, $J(\beta)$ in this example, can be globally rotated based on the pose $\theta$, denoted as $R_\theta$, to obtain a final hand model with corresponding three-dimensional coordinates for each of the 21 joints of the hand. Note that in other examples, hand model 118 may be replaced by an alternative body element model, or even a full skeletal model.

In one example, cropped hand images are provide as data inputs x (102), and the output of feature extractor 106, $\mathcal{F}(x)$, is provided to refinement module $\mathcal{R}$(108) along with an attention map $\mathcal{M}^l$ generated by attention map generator 110 at each recursive iteration (or loop) $l \in \{1,2,\ldots,l_{max}\}$. In some examples, the cropped hand images may be generated by a hand detector model, an image segmentation model, or the like.

Pose predictor takes $\mathcal{R}(\mathcal{F}(x))$ and $\mathcal{R}(\mathcal{F}(x), \mathcal{M}^l)$ as inputs respectively when l=0 and l>0, and predicts a rotation matrix $R \in SO(3)$, a translation $t \in \mathbb{R}^2$ and a scaling factors $\in \mathbb{R}^+$ along with its pose $\theta$ and shape $\beta$:

$$\theta, \beta, R, t, s = \begin{cases} \Psi_{pose}(\mathcal{R}(\mathcal{F}(x))), & l = 0 \\ \Psi_{pose}(\mathcal{R}(\mathcal{F}(x), \mathcal{M}^l)), & l > 0 \end{cases} \quad (1)$$

where $\Psi_{pose}(\cdot)$ represents two fully-connected layered operations. Three-dimensional locations of joints $J(\theta,\beta)$ are defined by hand model 118, and the detected keypoints can then be re-projected to two-dimensional image planes with a weak-perspective camera model parameterized by the R, t, and s parameters of Equation 1. to acquire two-dimensional location estimations ($J_{2D}$) with estimated camera parameters according to:

$$J_{3D}=J(\theta,\beta) \quad J_{2D}=s\pi RJ(\theta,\beta)+t' \quad (2)$$

where $\pi$ represents orthographic projections. With re-projected two-dimensional joint location estimations, the network is able to learn three-dimensional joint locations even when only two-dimensional labels exist in a training set.

In some examples, the criteria for training pose predictor 112 are L1 and L2 losses between the predictions and the ground-truths:

$$L_{2D}=\|J_{2D}{}^{gt}-\hat{J}_{2D}\|_1, \quad L_{3D}=\|J_{3D}{}^{gt}-\hat{J}_{3D}\|_2 \quad (3)$$

Generally, either $L_1$ or $L_2$ norms can be used for the loss function. Because two-dimensional predictions are a function of more variables (compared to the three-dimensional predictions owing to the projection variables), $L_1$ norm loss may provide more robust predictions for two-dimensional estimations.

Dynamic Exiting of the Iterative Backbone Network

Model architecture 100 may implement multiple exiting policies for the iterative backbone network 104. A first exiting policy option is heuristic based on uncertainty estimations 130 (e.g., the area of the total variances). For example, the loop may exit when the variances are smaller than a threshold. In such an example, gating function 128 is not required as the uncertainty estimations 130 are directly used for gating. A second exiting policy option utilizes gating function 128, which in one example comprises a single fully-connected. Beneficially, gating function 128 is trainable, as described further below with respect to Equation 12.

In the example depicted in FIG. 1, exiting the loop with iterative backbone network 104 is adaptively performed per input data sample using gating function 128. Thus, model architecture 100 may be referred to as an adaptive iterative scope network.

Generally, to decide on proceeding to a next loop of recursive inference of iterative backbone network 104, the model should be aware of how certain it is with respect to its current predictions. To this end, uncertainty estimator 124 estimates the variances for the two-dimensional/three-dimensional joint locations (e.g., keypoints) predictions (e.g., 120 and 122) by estimating a probability distribution instead of only joint locations. In one example, to simplify the problem, coordinates of joints are assumed to be independent in order to use a single variate Gaussian:

$$P_W(J) = \frac{1}{\sqrt{2\pi\sigma^2}} e^{\frac{(J-\hat{J})^2}{2\sigma^2}}, \quad (4)$$

where W refers to the trainable weights. A coordinate for a joint location is denoted as J, and $\hat{J}$ represents the estimated joint location. The closer the standard deviation $\sigma$ is to zero, the more confident the model is with its own estimation.

Having the target joint coordinate as Gaussian distribution with a σ→0, which is a Dirac-Delta function:

$$P_D(J)=\delta(J-J^{gt}), \quad (5)$$

with $J^{gt}$ indicating a ground truth joint position, the model aims to minimize an uncertainty loss component ($L_{var}$) based on the Kullback-Leibler (KL)-divergence between $P_W(J)$ and $P_D(J)$ and to learn confidence estimation according to:

$$L_{var} = D_{KL}(P_D(J)\|P_W(J)) \propto \frac{e^{-\alpha}}{2}(J^{gt}-\hat{J})^2 + \frac{1}{2}\alpha \quad (6)$$

where $\alpha=\log(\sigma^2)$, which is what the model architecture 100 predicts as uncertainty estimations 130. As outputs, uncertainty estimator 124 predicts the variance of its own two-dimensional/three-dimensional joint predictions according to:

$$\alpha_{2D}, \alpha_{3D} = \begin{cases} \Psi_{var}(\mathcal{R}(\mathcal{F}(x))), & l=0 \\ \Psi_{var}(\mathcal{R}(\mathcal{F}(x), \mathcal{M}^l)), & l>0 \end{cases} \quad (7)$$

where $\Psi_{var}(\cdot)=\Psi_{var}^2(\Psi_{var}^1(\cdot))$ represents fully-connected layers before variance estimations.

For three-dimensional joint predictions, the loss of variance estimation for three-dimensional joint localization can be set as:

$$L_{var_{3D}} = \frac{e^{-\alpha_{3D}}}{2}L_{3D} + \frac{1}{2}\alpha_{3D}. \quad (8)$$

Since two-dimensional joint locations are regressed with a smooth $L_1$ loss, the loss of variance for two-dimensional joint localization can be defined according to:

$$L_{var_{2D}}=e^{-\alpha_{2D}}(L_{2D}-\frac{1}{2})+\frac{1}{2}\alpha_{2D} \quad (9)$$

Having a summation of both losses for two-dimensional/three-dimensional joint localization variances with $L_{2D}$, $L_{3D}$ computed with Eq. 3, then gives:

$$L_{var} \propto e^{-\alpha_{2D}}L_{2D} + e^{-\alpha_{3D}}L_{3D} + \frac{\alpha_{2D}}{2} + \frac{\alpha_{3D}}{2}. \quad (10)$$

Uncertainty estimator 124 may thus learn variances as 1-dimensional vectors for its joint location predictions.

The aforementioned variances can be directly utilized for decisions of exiting (e.g., instead of using gating function 128). For example, a threshold value $\tau_{var}$ can be set for the average variance for current joint estimations. If the average variance is larger than a predefined threshold, another loop of refinement module 108 and attention map generator 110 is performed.

Gating Function

In addition to the heuristic uncertainty threshold values at each loop that can be used for exiting a loop, gating function 128 allows model architecture 100 to learn optimal exiting decisions. In other words, gating function 128 provides a learnable gating mechanism instead of a heuristic method based on uncertainty estimations 130. In some examples, gating function 128 may be implemented as a neural network model, which may be a portion of a larger model, such as model architecture 100.

For example, for an input x and attention maps generated at l-th loop $\mathcal{M}^l$, gating function 128 outputs a stochastic categorical decision of exiting after getting trained based on reward signals from Equation 11, below. The gating function $\mathcal{G}$ (128) takes feature vectors $f=\Psi_{var}^1(\cdot)$ from fully connected layers 125 of uncertainty estimator 124 as inputs. As shown in FIG. 1, and in Equation 7, f (126) is the intermediate feature output (e.g., a vector) that is used as the input to gating function 128.

To this end, the gating function $\mathcal{G}$ ($A_l|f_l$) may be trained with reinforcement updates for two possible categorical actions $A_l$, exit or not, based on uncertainty feature vectors $f_l$ at loop l, which is trained with on-policy vanilla policy gradient (a reinforcement learning algorithm used to train an agent based on reward signals) updates. While loss decreases with more iterations, there needs a penalty for increasing computational cost for each additional loop. The difference between the loss and the computational cost is set by a reward signal ($r_l$):

$$r_l=-\lambda(L_{2D}^l+L_{3D}^l)-lC \quad (11)$$

where λ represents a scale constant and the computational cost C refers to giga-floating point operations per second (GFLOPs) in one example. With such rewards, the policy ultimately tries to minimize the error of pose estimations while also minimizing the computational cost required. The learning gradients of the gating policy function can be expressed as:

$$\nabla_w J(W)=\mathbb{E}_{\mathcal{G}}[r_l \nabla_w \log \mathcal{G}_w(A_l|\alpha_l)] \quad (12)$$

where w represents learnable parameters of gating function 128.

Note that gating function 128 may be trained after training the remainder of model architecture 100, including uncertainty estimator 124. Thus, during the training of the gating function 128, the other portions of model architecture 100 are detached.

In one example, gating function 128 is trained using a reinforce algorithm such that during inferencing, the actions of gate function 128 (e.g., exit or do not exit) are sampled from the softmax probability distribution. Thus, the output of gating function 128 in such cases is probabilistic, not deterministic.

With a learned gating function 128, a temperature parameter $\tau_{gate}$ may be utilized to allow further control the harshness of its decisions even after training. Since gating function 128 is a categorical softmax function in this example, the trade-off between the computation cost and prediction accuracy can further be controlled during testing. Generally, higher values of $\tau_{gate}$ cause softer distribution of the softmax function.

Progressive Training

Model architecture 100 may initially be trained by looping partial layers and calculating losses based on the inference results at each loop. With a predefined maximum number of loops $l_{max}$, model architecture 100 may thus be trained by minimizing the sum of losses from all loops according to:

$$L_{total}=\Sigma_{l=0}^{l_{max}}\gamma_{2D}L_{2D}^l+\gamma_{3D}L_{3D}^l+\gamma_{var}L_{var}^l \quad (13)$$

where $\gamma_{2D}L_{2D}^l$ is the two-dimensional prediction loss weighted by a hyperparameter $\gamma_{2D}$, $L_{3D}^l$ is the three-dimensional prediction loss weighted by a hyperparameter $\gamma_{3D}$, and $L_{var}^l$ is the uncertainty loss weighted by a hyperparameter $\gamma_{var}$. Notably, model architecture 100 may be trained in either an end-to-end or a progressive manner. In an end-to-end training protocol, a single training is performed with a maximum number of loops, whereas in a progressive training protocol, model architecture 100 is trained multiple times during progressive increments of loop allowance.

FIG. 3 depicts an example of a progressive training algorithm 300.

Generally, during progressive training according to algorithm 300, model architecture 100 is trained $l_{max}$ times, training in each case of the maximum number of loops $l_{prog} \in \{0,1,2,\ldots,l_{max}\}$. Thus, model architecture 100 is initially trained without a loop for the case where $l_{prog}=0$. This initial training phase of progressive training protocol requires one batch normalization layer at the beginning of refinement module 108 for a single inference path. And for $l_{prog}>0$, model architecture 100 is initialized with $l_{prog}+1$ number of batch normalization layers. Model architecture 100 is then re-initialized with the parameters that were trained for the $l_{prog}-1$ case, except for the extra batch normalization layer.

Since model architecture 100 learns meaningful feature encoding layers when trained with $l_{prog}=0$, feature extractor 106 is detached from further learning when $l_{prog}>0$ and the learning rate is reduced by a factor, such as 1/10. The attention map generator 110 is trained with the original base learning rate. For example, training may start with a learning rate of 0.1 for the $0^{th}$ loop. Then in the $1^{st}$ loop, the feature extractor is detached from training and refinement module 108 is trained with a learning rate of 1/10*0.1=0.01, and this training rate is further reduced by 1/10 in each iteration. The attention map generator is trained with the original learning rate of 0.1.

Beneficially, progressive training method 300 has been empirically shown to ensure maximization of network's capacity at each loop cases, yielding higher rate of exits at early loop cases and lower average computational cost for validation samples.

EXAMPLE METHOD FOR POSE PREDICTION

Figure 4:
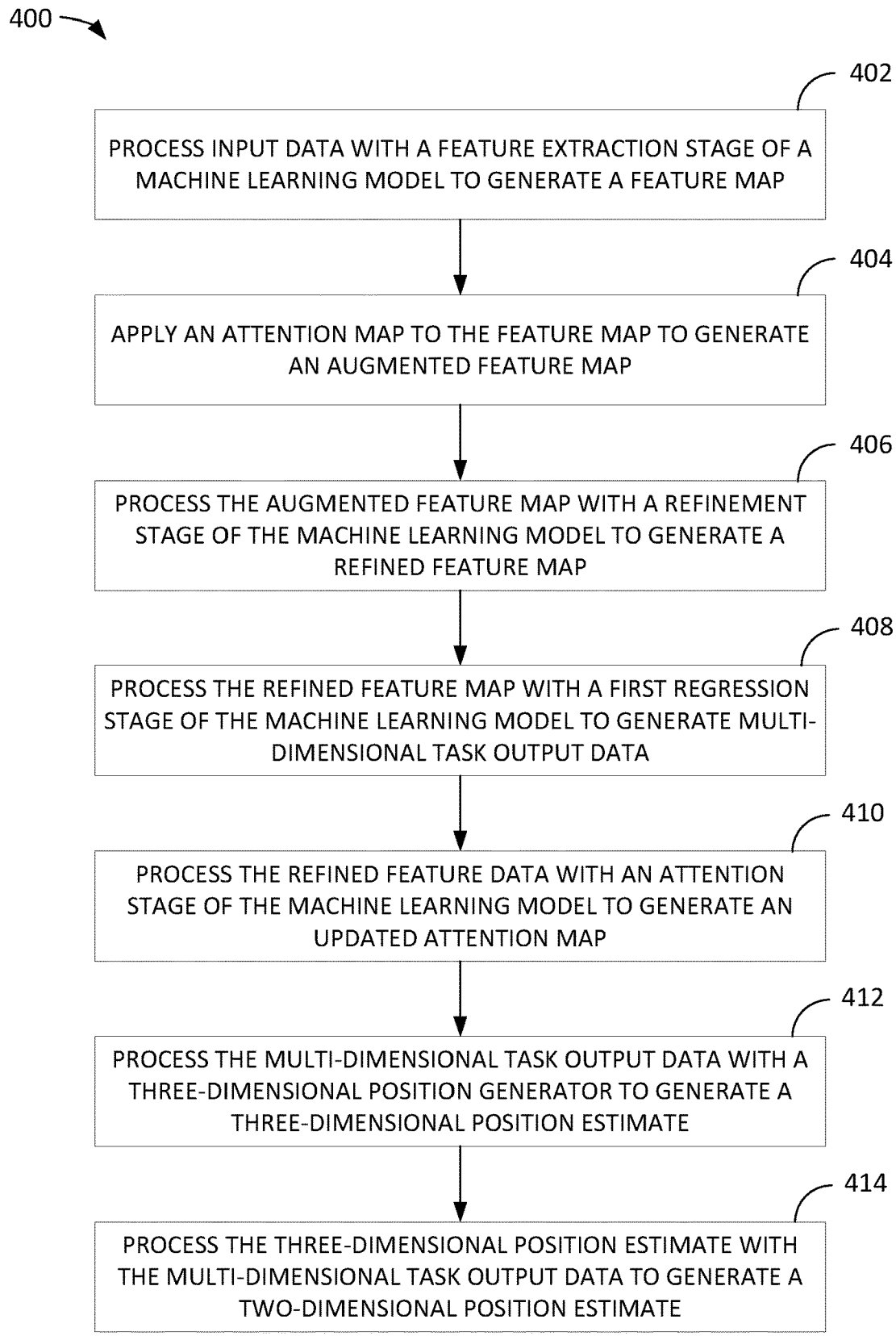
FIG. 4 depicts an example method for performing pose prediction, such as with the model architectures described with respect to FIGS. 1 and 2.

FIG. 4 depicts an example method 400 for performing pose prediction, such as with the model architectures described with respect to FIGS. 1 and 2.

Method 400 begins at step 402 with processing input data with a feature extraction stage of a machine learning model to generate a feature map. For example, the feature extraction stage may comprise a feature extractor, such as 106 of FIGS. 1 and 202 of FIG. 2.

Though not depicted, the feature map may be stored in a memory, such as a local memory, to be reused during iterative processing of the machine learning model, which saves processing compared to reprocessing the input data with the feature extraction stage during each iteration.

Method 400 then proceeds to step 404 with applying an attention map to the feature map to generate an augmented feature map. In some cases, the augmented feature map may be referred to as an attention-augmented feature map. For example, the attention map generator 110 of FIG. 1 or 206 of FIG. 2 may provide the attention map.

As described above, step 404 would generally happen after a first pass through the model where there is no augmentation, such as where the loop count l>0.

Method 400 then proceeds to step 406 with processing the augmented feature map with a refinement stage of the machine learning model to generate a refined feature map.

For example, the refinement stage may comprise a refinement module, such as 108 in FIG. 1 or 204 in FIG. 2.

In some aspects, processing the augmented feature map with the refinement stage of the machine learning model comprises applying a batch normalization layer to the augmented feature map, and the batch normalization layer is selected from a plurality of batch normalization layers based on a loop count.

Method 400 then proceeds to step 408 with processing the refined feature map with a first regression stage of the machine learning model to generate multi-dimensional task output data (e.g., 116 in FIG. 1). For example, the multi-dimensional task output data may include a rotation matrix R, a translation t, a scaling factor s, a pose $\theta$, and/or a shape $\beta$, as described above. In one example, the regression stage comprises one or more fully-connected layers of a pose predictor, such as fully connected layers 114 of pose predictor 112 in FIG. 1.

Method 400 then proceeds to step 410 with processing the refined feature data with an attention stage of the machine learning model to generate an updated attention map.

Note that the refined feature data may generally be the same as that used in step 408. In cases where parallel processing of various stages is implemented, the refined feature data may be stored in multiple copies to be accessed and processed by various stages at once.

Method 400 then proceeds to step 412 with processing the multi-dimensional task output data with a three-dimensional position generator to generate a three-dimensional position estimate, such as three-dimensional prediction 120 in FIG. 1. For example, the three-dimensional position generator may be a body element pose model, such as hand model 118 of FIG. 1, and the three-dimensional position estimate comprises one or more body element joint positions in a three-dimensional space, such as keypoint estimates.

Method 400 then proceeds to step 414 with processing the three-dimensional position estimate with the multi-dimensional task output data to generate a two-dimensional position estimate.

For example, a rotation matrix R, a translation t, and a scaling factor s, may be used to project a pose $\theta$ and a shape $\beta$ from three-dimensional to two-dimensional, where R, t, and s are extrinsic parameters of the camera capturing the input data used in step 402.

In some aspects, the two-dimensional position estimate comprises the one or more body element joint positions in a two-dimensional space.

Though not depicted in FIG. 4, method 400 may further include processing the refined feature map with a second regression stage of the machine learning model to generate a task uncertainty estimate. For example, the refined feature map may be processed by an uncertainty estimator like 124 in FIG. 1, and in particular by fully-connected layers 125 of uncertainty estimator 124.

Method 400 may further include determining an uncertainty associated with the three-dimensional position estimate based on the task uncertainty estimate; and determining an uncertainty associated with the two-dimensional position estimate based on the task uncertainty estimate. For example, fully-connected layers (e.g., another regression stage) of uncertainty estimator 124 of FIG. 1 may generate uncertainty estimations (e.g., variances 130) associated with the two-dimensional and three-dimensional position estimates.

Method 400 may further include processing the task uncertainty estimate with a loop decision stage of the machine learning model to generate a loop decision value and determining whether to exit processing of the machine learning model based on the loop decision value. In one example, the loop decision stage comprises gating function 128 of FIG. 1 and the loop decision value is a softmax value. As described above, in some cases, the loop decision value may be sampled from the softmax probability distribution.

Method 400 may further include displaying the two-dimensional position estimate on a display screen of an extended reality device. In some cases, the extended reality device may be a mobile device, such a smart phone, or a smart wearable device, such as glasses or a headset, or other devices.

Note that method 400 is one example method, and others are possible. In particular, other examples may include fewer, additional, and/or alternative steps as compared to method 400 consistent with the various aspects described herein.

EXAMPLE METHOD FOR TRAINING A POSE MODEL

Figure 5:
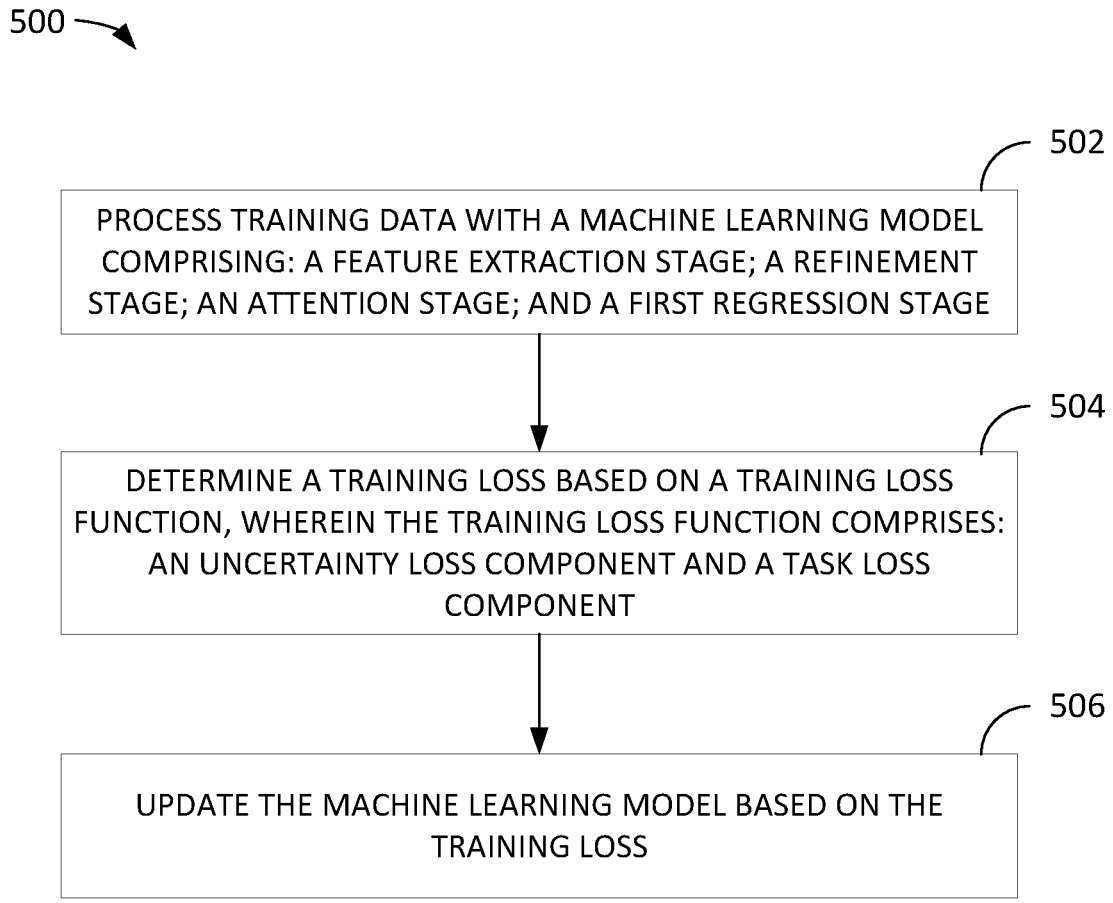
FIG. 5 depicts an example method for training a pose prediction model architecture, such as described with respect to FIGS. 1 and 2.

FIG. 5 depicts an example method 500 for training a pose prediction model architecture, such as described with respect to FIGS. 1 and 2.

Method 500 begins at step at 502 with processing training data with a machine learning model. In some cases, the machine learning model comprises: a feature extraction stage (e.g., feature extractor 106 in FIG. 1 or 202 in FIG. 2) configured to generate a feature map; a refinement stage (e.g., refinement module 108 in FIG. 1 or 204 in FIG. 2) configured to process an augmented feature map, based on the feature map and an attention map, and to generate a refined feature map; an attention stage (e.g., attention map generator 110 in FIGS. 1 and 206 in FIG. 2) configured to generate an updated attention map based on the refined feature map; and a first regression stage (e.g., fully connected layers 114 of pose predictor 112 in FIG. 1) configured to process the refined feature map to generate multi-dimensional task output data.

In some cases, the refinement stage of the machine learning model comprises a plurality of batch normalization layers, wherein each respective batch normalization layer is associated with a loop count.

Method 500 then proceeds to step 504 with determining a training loss based on a training loss function, wherein the training loss function (e.g., $L_{total}$ as described above with respect to Equation 13) comprises: an uncertainty loss component (e.g., $L_{var}$ as described above with respect to Equation 10) and a task loss component (e.g., $\gamma_{2D}L_{2D}^{1}$ and $\gamma_{3D}L_{3D}^{1}$ as described above with respect to Equation 13 and FIG. 3.

Method 500 then proceeds to step 506 with updating the machine learning model based on the training loss, such as depicted with respect to FIG. 3.

In some aspects, the machine leaning model further comprises a three-dimensional position generator (e.g., hand model 118 in FIG. 1) configured to process the multi-dimensional task output (e.g., parameters 116 in FIG. 1) and to generate a three-dimensional position estimate (e.g., three-dimensional predictions 120 in FIG. 1), and the task loss component comprises a three-dimensional position estimate error component (e.g., $\gamma_{3D}L_{3D}^{1}$ as in Equation 13).

In some aspects, the machine leaning model further comprises a two-dimensional position generator configured to process the three-dimensional position estimate with the multi-dimensional task output (e.g., 116 in FIG. 1) and to generate a two-dimensional position estimate (e.g., 122 in FIG. 1), and the task loss component comprises a two-dimensional position estimate error component (e.g., $\gamma_{2D}L_{2D}^{1}$ as in Equation 13).

In some aspects, the three-dimensional position generator comprises a body element pose model, such as hand model 118 in FIG. 1. In some aspects, the three-dimensional position estimate comprises one or more body element joint positions in a three-dimensional space, the two-dimensional position estimate comprises the one or more body element joint positions in a two-dimensional space, and the multi-dimensional task output data comprises a rotation matrix R, a translation t, and a scaling factor s, may be used to project a pose θ and a shape β.

In some aspects, the machine learning model further comprises a second regression stage (e.g., fully-connected layers 125 of uncertainty estimator 124 in FIG. 1) configured to generate a task uncertainty estimate, wherein the task uncertainty estimate comprises a three-dimensional position estimate variance component of the uncertainty loss component and a two-dimensional position estimate variance component of the uncertainty loss component, such as uncertainty estimations 130 in FIG. 1.

In some aspects, the machine learning model further comprises a loop decision stage (e.g., gating function 128 of FIG. 1) configured to process the task uncertainty estimate and determine a loop decision value.

Note that method 500 is one example method, and others are possible. In particular, other examples may include fewer, additional, and/or alternative steps as compared to method 500 consistent with the various aspects described herein.

EXAMPLE PROCESSING SYSTEM

Figure 6:
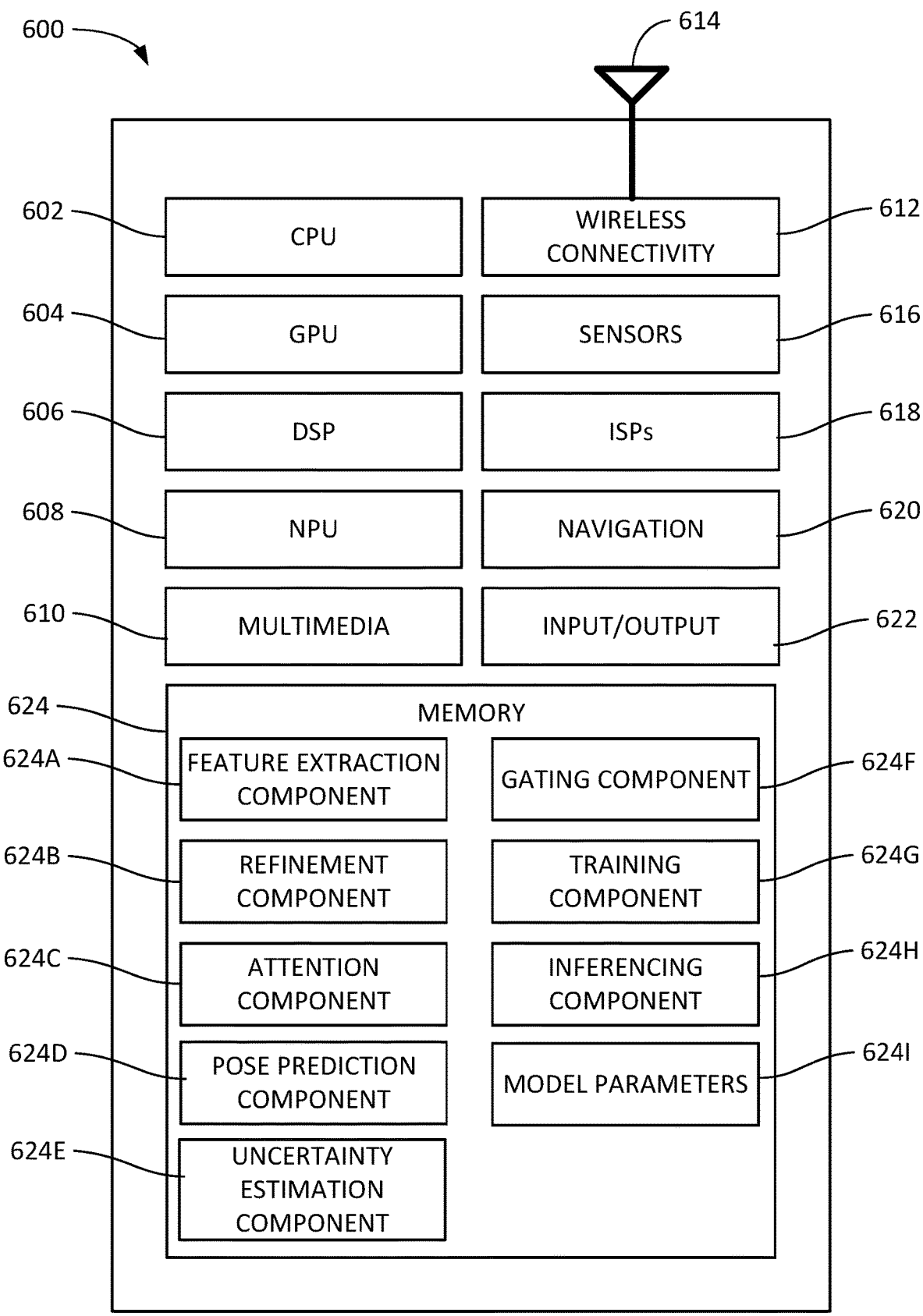
FIG. 6 depicts an example processing system that may be configured to perform the methods described herein.

FIG. 6 depicts an example processing system 600 that may be configured to perform the methods described herein, such as with respect to FIGS. 3-5.

Processing system 600 includes a central processing unit (CPU) 602, which in some examples may be a multi-core CPU. Instructions executed at the CPU 602 may be loaded, for example, from a program memory associated with the CPU 602 or may be loaded from memory 624.

Processing system 600 also includes additional processing components tailored to specific functions, such as a graphics processing unit (GPU) 604, a digital signal processor (DSP) 606, a neural processing unit (NPU) 608, a multimedia processing unit 610, and a wireless connectivity component 612.

In some aspects, one or more of CPU 602, GPU 604, DSP 606, and NPU 608 may be configured to perform the methods described herein with respect to FIGS. 3-5.

An NPU, such as 608, is generally a specialized circuit configured for implementing all the necessary control and arithmetic logic for executing machine learning algorithms, such as algorithms for processing artificial neural networks (ANNs), deep neural networks (DNNs), random forests (RFs), kernel methods, and the like. An NPU may sometimes alternatively be referred to as a neural signal processor (NSP), a tensor processing unit (TPU), a neural network processor (NNP), an intelligence processing unit (IPU), or a vision processing unit (VPU).

NPUs, such as 608, may be configured to accelerate the performance of common machine learning tasks, such as image classification, machine translation, object detection, and various other tasks. In some examples, a plurality of NPUs may be instantiated on a single chip, such as a system on a chip (SoC), while in other examples they may be part of a dedicated machine learning accelerator device.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In some aspects, NPU 608 may be implemented as a part of one or more of CPU 602, GPU 604, and/or DSP 606.

In some aspects, wireless connectivity component 612 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 612 is further connected to one or more antennas 614.

Processing system 600 may also include one or more sensor processing units 616 associated with any manner of sensor, one or more image signal processors (ISPs) 618 associated with any manner of image sensor, and/or a navigation processor 620, which may include satellite-based positioning system components (e.g., GPS or GLONASS) as well as inertial positioning system components.

Processing system 600 may also include one or more input and/or output devices 622, such as screens, touch-sensitive surfaces (including touch-sensitive displays), physical buttons, speakers, microphones, and the like.

In some examples, one or more of the processors of processing system 600 may be based on an ARM or RISC-V instruction set.

Processing system 600 also includes memory 624, which is representative of one or more static and/or dynamic memories, such as a dynamic random access memory, a flash-based static memory, and the like. In this example, memory 624 includes computer-executable components, which may be executed by one or more of the aforementioned components of processing system 600.

In particular, in this example, memory 624 includes feature extraction component 624A, refinement component 624B, attention component 624C, pose prediction component 624D, uncertainty estimation component 624E, gating component 626F, training component 624G, inferencing component 624H, and model parameters 624I (e.g., weights, biases, and other machine learning model parameters). One or more of the depicted components, as well as others not depicted, may be configured to perform various aspects of the methods described herein.

In one example: feature extraction component 624A may be implemented by feature extractor 106 in FIGS. 1 and 202 in FIG. 2; refinement component 624B may be implemented by refinement module 108 in FIGS. 1 and 204 in FIG. 2; attention component 624C may be implemented by attention map generator 110 in FIGS. 1 and 206 in FIG. 2; pose prediction component 624D may be implemented by pose predictor 112 in FIG. 1; uncertainty estimation component 624E may be implemented by uncertainty estimator 124 in FIG. 1; and gating component 626F may be implemented by gating function 128 in FIG. 1. Further, training component 624G may implement algorithm 300 in some examples.

Generally, processing system 600 and/or components thereof may be configured to perform the methods described herein.

Notably, in other aspects, aspects of processing system 600 may be omitted, such as where processing system 600 is a server computer or the like. For example, multimedia component 610, wireless connectivity 612, sensors 616, ISPs 618, and/or navigation component 620 may be omitted in other aspects. Further, aspects of processing system 600 maybe distributed.

Note that FIG. 6 is just one example, and in other examples, alternative processing system with fewer, additional, and/or alternative components may be used.

EXAMPLE CLAUSES

Implementation examples are described in the following numbered clauses:

Clause 1: A method, comprising: processing input data with a feature extraction stage of a machine learning model to generate a feature map; applying an attention map to the feature map to generate an augmented feature map; processing the augmented feature map with a refinement stage of the machine learning model to generate a refined feature map; processing the refined feature map with a first regression stage of the machine learning model to generate multi-dimensional task output data; and processing the refined feature data with an attention stage of the machine learning model to generate an updated attention map.

Clause 2: The method of Clause 1, further comprising processing the multi-dimensional task output data with a three-dimensional position generator to generate a three-dimensional position estimate.

Clause 3: The method of Clause 2, further comprising processing the three-dimensional position estimate with the multi-dimensional task output data to generate a two-dimensional position estimate.

Clause 4: The method of Clause 3, wherein the three-dimensional position generator comprises a body element pose model.

Clause 5: The method of Clause 4, wherein: the three-dimensional position estimate comprises one or more body element joint positions in a three-dimensional space, the two-dimensional position estimate comprises the one or more body element joint positions in a two-dimensional space, and the multi-dimensional task output data comprises one or more of: a rotation estimate, a translation estimate, or a scaling estimate.

Clause 6: The method of Clause 5, wherein the body element pose model comprises a hand model.

Clause 7: The method of any one of Clauses 1-6, further comprising processing the refined feature map with a second regression stage of the machine learning model to generate a task uncertainty estimate.

Clause 8: The method of Clause 7, further comprising: determining an uncertainty associated with the three-dimensional position estimate based on the task uncertainty estimate; and determining an uncertainty associated with the two-dimensional position estimate based on the task uncertainty estimate.

Clause 9: The method of any one of Clauses 7-8, further comprising: processing the task uncertainty estimate with a loop decision stage of the machine learning model to generate a loop decision value; determining whether to exit processing of the machine learning model based on the loop decision value.

Clause 10: The method of any one of Clauses 1-9, wherein: processing the augmented feature map with the refinement stage of the machine learning model comprises applying a batch normalization layer to the augmented feature map, and the batch normalization layer is selected from a plurality of batch normalization layers based on a loop count.

Clause 11: The method of Clause 5, further comprising displaying the two-dimensional position estimate on a display screen of an extended reality device.

Clause 12: The method of Clause 9, further comprising determining to exit processing of the machine learning model based on the loop decision value.

Clause 13: The method of Clause 9, further comprising: determining not to exit processing of the machine learning model based on the loop decision value; and determining to exit processing of the machine learning model based on a loop count.

Clause 14: The method of Clause 1, further comprising: determining a training loss based on a training loss function, wherein the training loss function comprises: an uncertainty loss component; and a task loss component; and updating the machine learning model based on the training loss.

Clause 15: A method of training a machine learning model, comprising: processing training data with a machine learning model, wherein the machine learning model comprises: a feature extraction stage configured to generate a feature map; a refinement stage configured to process an augmented feature map, based on the feature map and an attention map, and to generate a refined feature map; an attention stage configured to the refined feature map and to generate an updated attention map; and a first regression stage configured to process the refined feature map to generate multi-dimensional task output data; determining a training loss based on a training loss function, wherein the training loss function comprises: an uncertainty loss component; and a task loss component; and updating the machine learning model based on the training loss.

Clause 16: The method of Clause 15, wherein: the machine leaning model further comprises a three-dimensional position generator configured to process the multi-dimensional task output and to generate a three-dimensional position estimate, and the task loss component comprises a three-dimensional position estimate error component.

Clause 17: The method of Clause 15, wherein: the machine leaning model further comprises a two-dimensional position generator configured to process the three dimensional position estimate with the multi-dimensional task output and to generate a two-dimensional position estimate, and the task loss component comprises a two-dimensional position estimate error component.

Clause 18: The method of Clause 17, wherein the three-dimensional position generator comprises a body element pose model.

Clause 19: The method of Clause 18, wherein: the three-dimensional position estimate comprises one or more body element joint positions in a three-dimensional space, the two-dimensional position estimate comprises the one or more body element joint positions in a two-dimensional space, and the multi-dimensional task output data comprises one or more of: a rotation estimate, a translation estimate, or a scaling estimate.

Clause 20: The method of any one of Clauses 18-19, wherein the body element pose model comprises a hand model.

Clause 21: The method of any one of Clauses 15-20, wherein the machine learning model further comprises: a second regression stage configured to generate a task uncertainty estimate, wherein the task uncertainty estimate comprises: a three-dimensional position estimate variance component of the uncertainty loss component; a two-dimensional position estimate variance component of the uncertainty loss component.

Clause 22: The method of Clause 21, wherein the machine learning model further comprises a loop decision stage configured to process the task uncertainty estimate and determine a loop decision value.

Clause 23: The method of any one of Clauses 15-22, wherein the refinement stage of the machine learning model comprises a batch normalization layer parameterized based on the augmented feature map.

Clause 24: A processing system, comprising: a memory comprising computer-executable instructions; one or more processors configured to execute the computer-executable instructions and cause the processing system to perform a method in accordance with any one of Clauses 1-23.

Clause 25: A processing system, comprising means for performing a method in accordance with any one of Clauses 1-23.

Clause 26: A non-transitory computer-readable medium comprising computer-executable instructions that, when executed by one or more processors of a processing system, cause the processing system to perform a method in accordance with any one of Clauses 1-23.

Clause 27: A computer program product embodied on a computer-readable storage medium comprising code for performing a method in accordance with any one of Clauses 1-23.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. §112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
  processing input data with a feature extraction stage of a machine learning model to generate a feature map;
  applying an attention map to the feature map to generate an augmented feature map;
  selecting a batch normalization layer, from a plurality of batch normalization layers, based on a loop count;
  processing the augmented feature map with a refinement stage of the machine learning model to generate a refined feature map, wherein processing the augmented feature map with the refinement stage of the machine learning model comprises applying the batch normalization layer to the augmented feature map;
  processing the refined feature map with a first regression stage of the machine learning model to generate multi-dimensional task output data; and
  processing the refined feature map with an attention stage of the machine learning model to generate an updated attention map.

2. The method of claim 1, further comprising processing the multi-dimensional task output data with a three-dimensional position generator to generate a three-dimensional position estimate.

3. The method of claim 2, further comprising processing the three-dimensional position estimate with the multi-dimensional task output data to generate a two-dimensional position estimate.

4. The method of claim 3, wherein the three-dimensional position generator comprises a body element pose model.

5. The method of claim 4, wherein:
  the three-dimensional position estimate comprises one or more body element joint positions in a three-dimensional space,
  the two-dimensional position estimate comprises the one or more body element joint positions in a two-dimensional space, and
  the multi-dimensional task output data comprises one or more of:
    a rotation estimate,
    a translation estimate, or
    a scaling estimate.

6. The method of claim 5, wherein the body element pose model comprises a hand model.

7. The method of claim 5, further comprising processing the refined feature map with a second regression stage of the machine learning model to generate a task uncertainty estimate.

8. The method of claim 7, further comprising:
  determining an uncertainty associated with the three-dimensional position estimate based on the task uncertainty estimate; and
  determining an uncertainty associated with the two-dimensional position estimate based on the task uncertainty estimate.

9. The method of claim 7, further comprising:
  processing the task uncertainty estimate with a loop decision stage of the machine learning model to generate a loop decision value; and
  determining whether to exit processing of the machine learning model based on the loop decision value.

10. The method of claim 9, further comprising determining to exit processing of the machine learning model based on the loop decision value.

11. The method of claim 9, further comprising:
  determining not to exit processing of the machine learning model based on the loop decision value; and
  determining to exit processing of the machine learning model based on a loop count.

12. The method of claim 5, further comprising displaying the two-dimensional position estimate on a display screen of an extended reality device.

13. The method of claim 1, further comprising:
  determining a training loss based on a training loss function, wherein the training loss function comprises:
    an uncertainty loss component; and
    a task loss component; and
  updating the machine learning model based on the training loss.

14. A processing system, comprising:
one or more processors individually or collectively configured to execute instructions stored on one or more memories and to cause the processing system to:
process input data with a feature extraction stage of a machine learning model to generate a feature map;
apply an attention map to the feature map to generate an augmented feature map;
select a batch normalization layer from a plurality of batch normalization layers based on a loop count;
process the augmented feature map with a refinement stage of the machine learning model to generate a refined feature map, wherein in order to process the augmented feature map with the refinement stage of the machine learning model, the one or more processors are further configured to cause the processing system to apply the batch normalization layer to the augmented feature map;
process the refined feature map with a first regression stage of the machine learning model to generate multi-dimensional task output data; and
process the refined feature map with an attention stage of the machine learning model to generate an updated attention map.

15. The processing system of claim 14, wherein the one or more processors are further configured to cause the processing system to process the multi-dimensional task output data with a three-dimensional position generator to generate a three-dimensional position estimate.

16. The processing system of claim 15, wherein the one or more processors are further configured to cause the processing system to process the three-dimensional position estimate with the multi-dimensional task output data to generate a two-dimensional position estimate.

17. The processing system of claim 16, wherein the three-dimensional position generator comprises a body element pose model.

18. The processing system of claim 17, wherein:
the three-dimensional position estimate comprises one or more body element joint positions in a three-dimensional space,
the two-dimensional position estimate comprises the one or more body element joint positions in a two-dimensional space, and
the multi-dimensional task output data comprises one or more of:
a rotation estimate,
a translation estimate, or
a scaling estimate.

19. The processing system of claim 18, wherein the body element pose model comprises a hand model.

20. The processing system of claim 18, wherein the one or more processors are further configured to cause the processing system to display the two-dimensional position estimate on a display screen of an extended reality device.

21. The processing system of claim 16, wherein the one or more processors are further configured to cause the processing system to process the refined feature map with a second regression stage of the machine learning model to generate a task uncertainty estimate.

22. The processing system of claim 21, wherein the one or more processors are further configured to cause the processing system to:
determine an uncertainty associated with the three-dimensional position estimate based on the task uncertainty estimate; and
determine an uncertainty associated with the two-dimensional position estimate based on the task uncertainty estimate.

23. The processing system of claim 21, wherein the one or more processors are further configured to cause the processing system to:
process the task uncertainty estimate with a loop decision stage of the machine learning model to generate a loop decision value; and
determine whether to exit processing of the machine learning model based on the loop decision value.

24. The processing system of claim 23, wherein the one or more processors are further configured to cause the processing system to determine to exit processing of the machine learning model based on the loop decision value.

25. The processing system of claim 23, wherein the one or more processors are further configured to cause the processing system to:
determine not to exit processing of the machine learning model based on the loop decision value; and
determine to exit processing of the machine learning model based on a loop count.

26. The processing system of claim 14, wherein the one or more processors are further configured to cause the processing system to:
determine a training loss based on a training loss function, wherein the training loss function comprises:
an uncertainty loss component; and
a task loss component; and
update the machine learning model based on the training loss.

27. A non-transitory computer-readable medium comprising computer-executable instructions that, when executed by one or more processors of a processing system, cause the processing system to perform a method, the method comprising:
processing input data with a feature extraction stage of a machine learning model to generate a feature map;
applying an attention map to the feature map to generate an augmented feature map;
selecting a batch normalization layer, from a plurality of batch normalization layers, based on a loop count;
processing the augmented feature map with a refinement stage of the machine learning model to generate a refined feature map, wherein processing the augmented feature map with the refinement stage of the machine learning model comprises applying the batch normalization layer to the augmented feature map;
processing the refined feature map with a first regression stage of the machine learning model to generate multi-dimensional task output data; and
processing the refined feature map with an attention stage of the machine learning model to generate an updated attention map.

28. A processing system, comprising:
means for processing input data with a feature extraction stage of a machine learning model to generate a feature map;
means for applying an attention map to the feature map to generate an augmented feature map;
means for selecting a batch normalization layer, from a plurality of batch normalization layers, based on a loop count;
means for processing the augmented feature map with a refinement stage of the machine learning model to generate a refined feature map, wherein means for processing the augmented feature map with the refinement stage of the machine learning model comprise means for applying the batch normalization layer to the augmented feature map;

means for processing the refined feature map with a first regression stage of the machine learning model to generate multi-dimensional task output data; and means for processing the refined feature map with an attention stage of the machine learning model to generate an updated attention map.

\* \* \* \* \*